United States Patent [19]

Matsuzawa et al.

[11] Patent Number: 5,675,453
[45] Date of Patent: Oct. 7, 1997

[54] CORE SLIDER FOR MAGNETIC DISK, HAVING OPPOSED RECESSES DEFINING NARROW FINAL TRACK WHICH DETERMINES NOMINAL MAGNETIC GAP WIDTH

[75] Inventors: Soichiro Matsuzawa, Kuwana; Nobuhiro Terada, Kasugai, both of Japan

[73] Assignee: NGK Insulators, Ltd., Japan

[21] Appl. No.: 833,428

[22] Filed: Feb. 10, 1992

[30] Foreign Application Priority Data

Feb. 14, 1991 [JP] Japan ................... 3-042514

[51] Int. Cl.$^6$ ............................. G11B 5/60; G11B 5/23
[52] U.S. Cl. ............................. 360/103; 360/119
[58] Field of Search ................... 360/119, 121, 360/120, 125, 127, 103

[56] References Cited

U.S. PATENT DOCUMENTS

| | | | |
|---|---|---|---|
| 4,425,701 | 1/1984 | Takahashi et al. | 360/121 |
| 4,948,460 | 8/1990 | Sandaiji et al. | 360/126 |
| 5,003,688 | 4/1991 | Terada et al. | 360/127 |
| 5,012,572 | 5/1991 | Matsuzawa et al. | 360/103 |
| 5,020,213 | 6/1991 | Aronoff et al. | 360/103 |
| 5,105,529 | 4/1992 | Yasar et al. | 360/103 |

FOREIGN PATENT DOCUMENTS

| | | |
|---|---|---|
| 0325300 | 7/1989 | European Pat. Off. |
| 0361809 | 4/1990 | European Pat. Off. |
| 64-69947 | 3/1989 | Japan |

OTHER PUBLICATIONS

Patent Abstracts of Japan vol. 11, No. 194 (P–558) Jun. 23, 1987 & JP–A–62,018,615 (NEC Corp.) Jan. 27, 1987.

Patent Abstracts of Japan vol. 14, No. 577 (P–1146) Dec. 21, 1990 & JP–A–2,247,815 (NGK Insulators) Oct. 3, 1990.

*Primary Examiner*—Robert S. Tupper
*Assistant Examiner*—David Davis
*Attorney, Agent, or Firm*—Parkhurst, Wendel & Burr, L.L.P.

[57] ABSTRACT

A magnetic head core slider including an air bearing and a core portion with a magnetic gap provided adjacent one of lengthwise opposite ends of the air bearing. A preliminary track is defined by preliminary width-defining grooves such that the preliminary track extends across the magnetic gap in the direction of extension of the air bearing, each groove having a depth larger than the depth of the magnetic gap. An effective track is defined by a pair of opposed final width-defining recesses formed adjacent to the magnetic gap such that the effective track extends across the magnetic gap in the direction of extension of the air bearing. The length and width of the effective track are smaller than those of the preliminary track, and the width of the effective track determines the nominal width of the magnetic gap. Each recess has a depth smaller than that of the preliminary width-defining grooves but larger than that of the magnetic gap. Also disclosed is a process of fabricating the head core slider.

6 Claims, 12 Drawing Sheets

CORE SLIDER FOR MAGNETIC DISK, HAVING OPPOSED RECESSES DEFINING NARROW FINAL TRACK WHICH DETERMINES NOMINAL MAGNETIC GAP WIDTH

BACKGROUND OF THE INVENTION

1. Field of the Invention

The present invention relates generally to a head core slider for a magnetic disk and a process of fabricating the same, and more particularly to a magnetic head core slider having a track or magnetic gap whose width is narrow enough to ensure high-density recording or data writing on a magnetic disk, and a process suitable for fabricating such a head core slider.

2. Discussion of the Prior Art

In the art of a rigid magnetic disk drive, there is known a floating-type magnetic head core slider having air bearings on which a rotating magnetic disk flies above the air bearing surfaces. This floating-type magnetic head core slider is classified into a so-called composite type and a so-called monolithic type. In the composite type core slider, a core chip having a writing/reading gap or track is integrally built in a slider body which has the air bearings. In the monolithic type core slider, the writing/reading gap or track and the air bearings are formed as integral parts on an integral body which includes a head core portion having the gap and a slider portion having the air bearing surfaces.

Figures 11A, 11B:
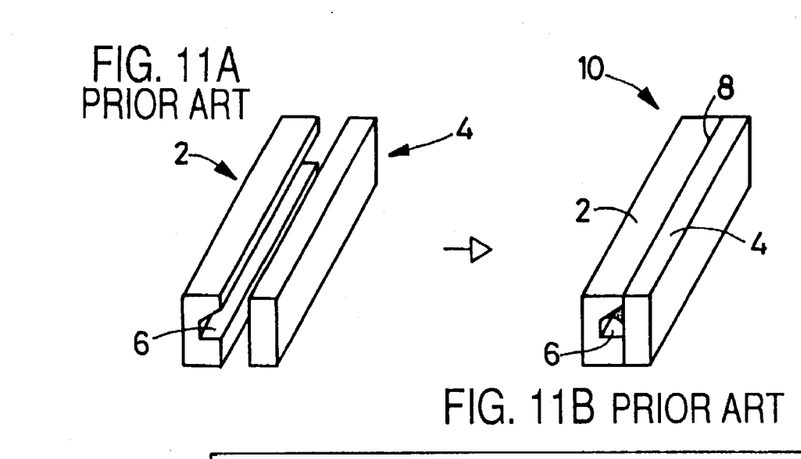
FIGS. 11A–11F are views showing an example of a known process of fabricating a core chip for a composite type head core slider for a magnetic disk.
Figure 11C:
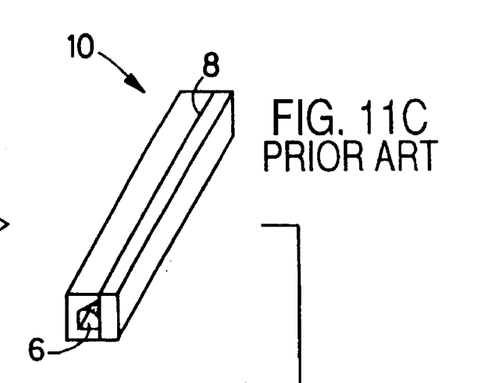
Figure 11D:
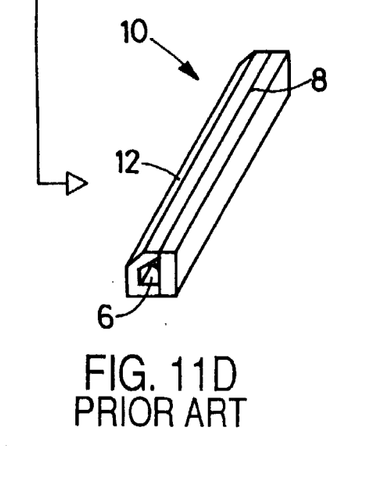
Figure 11E:
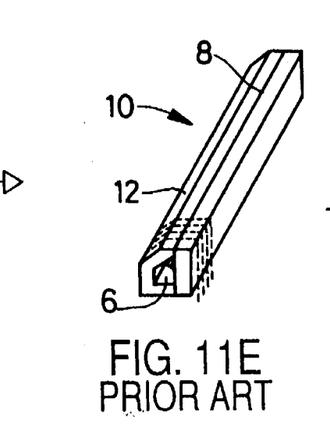
Figure 11F:
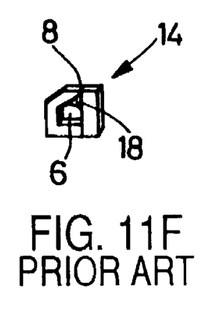

In fabricating the composite type magnetic head core slider, the slider body having air bearings formed thereon, and the core chip having a track with a writing/reading magnetic gap formed therein for writing and reading information on or from a magnetic disk, are prepared independently of each other, and are assembled together into an integral unit. An example of the known process for preparing a core chip is illustrated in FIGS. 11A–11F, wherein two core bars such as ferrite blocks 2, 4 (FIG. 11A) are butted and bonded together into a so-called gap bar 10 (FIG. 11B) having a coil-winding groove 6, and a magnetic gap 8 which has a suitable minute spacing between opposite surfaces of the two ferrite blocks 2, 4. The opposite top and bottom surfaces and the opposite side surfaces of the gap bar 10 are ground, as indicated in FIG. 11C, and one of the four corners is chamfered to form an inclined surface or ramp 12 as shown in FIG. 11D. The ground top surface of the gap bar 10 provides a sliding surface or track on which the magnetic disk slides in operation. Then, the gap bar 10 is cut as indicated by broken lines in FIG. 11E, into individual core chips 14, one of which is shown in FIG. 11F. Each core chip 14 has a predetermined dimension in the longitudinal direction of the gap bar 10.

Figure 12:
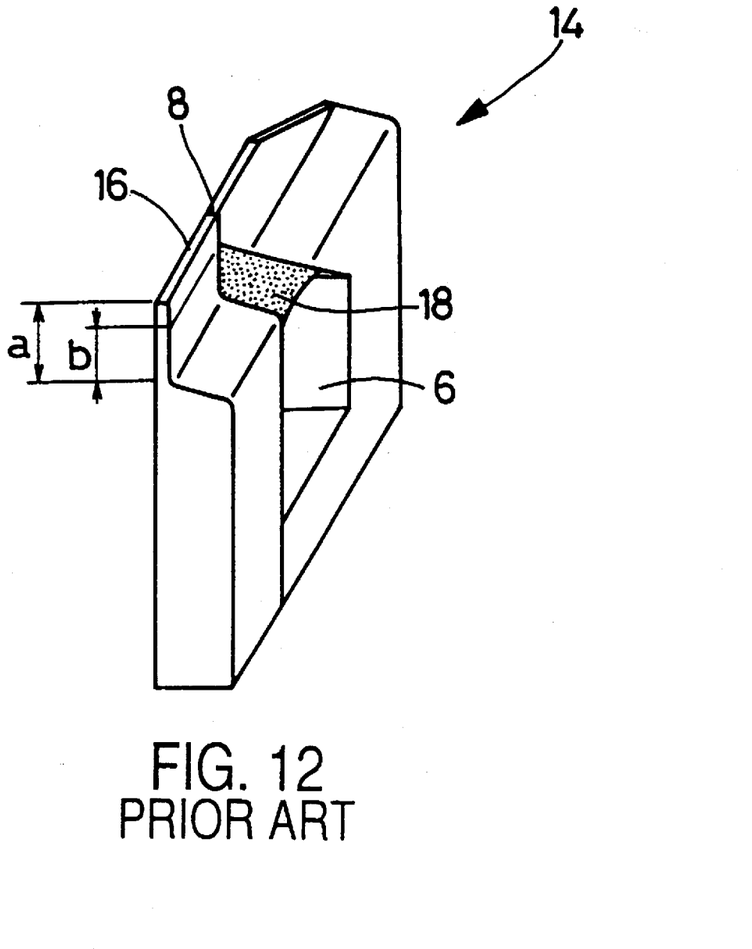
FIG. 12 is a perspective view of the core chip fabricated by the known process of FIG. 11.

The core chip 14 is further processed to form a track 16 whose width determines the width of the magnetic gap 8, as shown in FIG. 12, and a reinforcing glass filler 18 is applied to protect the magnetic gap 8 and a portion of the groove 6 adjacent to the gap 8. Usually, the track 16 is formed by a mechanical cutting process, such that an overall initial height "a" as measured down to the depth of the gap 8 is generally 40–50 μm or more, for a final height "b" (final depth of the gap 8) of at least 20–30 μm. For accurate formation of the track 16, the final height "b" must not be less than 20–30 μm.

Figure 13A:
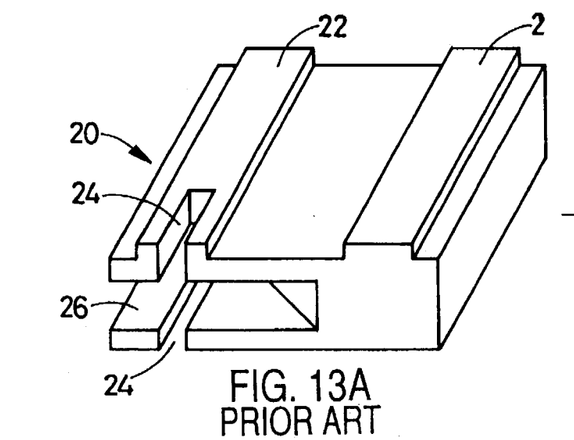
FIGS. 13A–13D are views showing an example of a known process of fabricating the composite type head core slider using the core chip fabricated in the process of FIGS. 11A–11F.
Figure 13B:
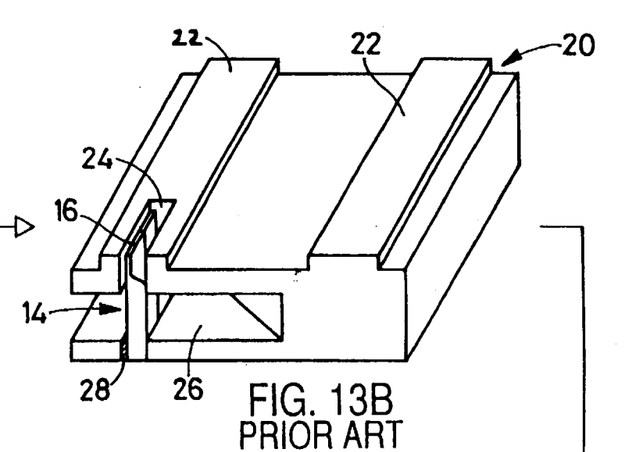
Figure 13C:
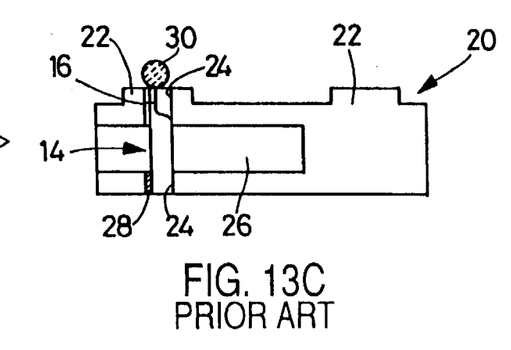
Figure 13D:
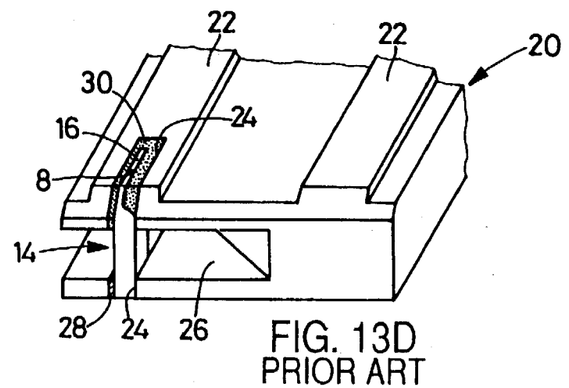

An example of the slider body for the composite type magnetic head core slider is indicated at 20 in FIGS. 13A–13D. The slider body 20, which is made of $CaTiO_3$ or other material as well known in the art, has parallel air bearings 22, 22 formed on the surface on which the magnetic disk flies. The slide body 20 also has receiving grooves 24 and a coil-winding slot 26 for winding a coil on the core chip 14 after the core chip 14 is accommodated in the grooves 24, as indicated in FIG. 13B. The core chip 14 is positioned by a suitable spacer filler 28. For bonding the core chip 14 to the slider body 20, a bonding glass 30 in the form of a rod is placed on the top surface of the core chip 14, as indicated in FIG. 13C, and the glass rod 30 is melted to fill the clearances between the core chip 14 and the surfaces of the slider body 20 defining the grooves 24, as indicated in FIG. 13D. The slider body 20 with the core chip 14 thus fixed therein is then subjected to finishing operations as known in the art, to taper the leading edge, chamfer the trailing edge, and to grind the air bearings 22 and the top of the core chip 14 so that the magnetic gap 8 is given the nominal depth.

In the known composite type magnetic head core slider described above, the core chip 14 is ground on the opposite side surfaces, and is then cut to form the track 16 having the initial height dimension "a". The depth of this cut reaches far down into the groove 6, as shown in FIG. 12. Due to this large initial height dimension "a", the final depth of the magnetic gap 8 obtained by the finish grinding operation amounts to 30–40 μm, or more close to the dimension "a". On the other hand, it is desirable that the width of the track 16 or magnetic gap 8 be 10 μm or less, for example, to meet the recent requirement for high-density recording on a magnetic disk. Where the track 16 is formed with such a small width, the track 16 tends to be easily broken or chipped, and have a relatively large magnetic resistance due to the large depth of cut reaching far down into the groove 6, to form the the narrow and high track 16. Further, the glass filler 30 on the opposite sides of the track 16 as shown in FIG. 13D tends to cause a large strain of the track 16, having a significant adverse effect on the operating characteristic of the magnetic head core slider, namely, increase in the magnetic resistance, and reduction of the output signal level of the head core when information is read from the magnetic disk.

In fabricating the monolithic type magnetic head core slider, a so-called gap bar is formed by bonding together two ferrite core blocks, such that the gap bar has a coil-winding groove and a magnetic gap (formed in a track). The gap bar incorporates a head core having a closed magnetic path defined by one of the ferrite blocks which cooperates with the other ferrite block to give the head core, and an adjacent portion of the other ferrite block which gives a slider body. A so-called yoke portion having the head core is formed by cutting the gap bar. An example of the monolithic type magnetic head core slider which has a center rail, i.e., three rails including the center rail, is disclosed in U.S. Pat. No. 4,948,460. In this head core slider, a track is formed between a right and a left air bearing, and a yoke portion which gives a head core having a closed magnetic path is formed on an extension line of the track, as an integral part of the track. The head core slider of this kind is conventionally widely used. Where the width of the track (width of the magnetic gap) is reduced to 10 μm or less, for example, to meet the need for high-density recording, however, the chamfered trailing edge of the head core tends to be easily chipped due to sliding contact with the magnetic disk.

In an effort to increase the effective recording area of a magnetic disk, there is a growing need for a two-rail type monolithic magnetic head core slider, rather than the three-rail type discussed above. An example of the two-rail type is disclosed in laid-open Publication No. 1-69947 of unexamined Japanese Patent Application filed in the name of the assignee of the present application. Like the composite type head core slider described above, the track provided on this two-rail type monolithic head core slider tends to have a height as large as 40–50 μm in the direction of depth of the magnetic gap, whereby the track if formed with a small width tends to be easily chipped during grinding or other mechanical cutting of the gap bar. Thus, the conventional monolithic type head core slider suffers from a low yield ratio, an increased magnetic resistance at the track portion, and a considerable adverse effect of the strain caused by the bonding glass filler on the opposite sides of the track, thereby deteriorating the operating characteristics of the head core, such as the information reading signal level.

SUMMARY OF THE INVENTION

It is therefore an object of this invention to provide a head core slider for a magnetic disk, which is free from the drawbacks as experienced in the conventional fabrication process, such as chipping of the track and low yield ratio, and which is also free from the deterioration of the operating characteristics of the head core as encountered on the known head core slider, such as an increase in the magnetic resistance at the track portion even with a small width, namely, the head core slider which assures improved operating characteristics such as increased output level in an information reading operation.

A second object of the invention is to provide a process suitable for fabricating the head core slider described above.

The first object may be achieved according to one aspect of this invention, which provides a head core slider for a magnetic disk, including a slider body portion having an air bearing extending in a direction of length thereof, and a core portion provided adjacent one of lengthwise opposite ends of the air bearing, the core portion having a magnetic gap which is open in a track surface whose height is substantially the same as the air bearing, the magnetic gap having a depth in a direction of the height of the track surface, the present head core slider being characterized comprising (a) means for defining preliminary width-defining grooves defining a preliminary track which extends across the magnetic gap in the direction of length of the air bearing and which has a first length and a first width, each of the grooves having a first depth larger than the depth of the magnetic gap, and (b) means for defining a pair of opposed final width-defining recesses formed adjacent to the magnetic gap and defining an effective track which extends across the magnetic gap in the direction of length of the air bearing. This effective track has a second length and a second width which are smaller than the first length and width of the preliminary track, respectively, the second width determining a nominal width of the magnetic gap. Each of the recesses has a second depth which is smaller than the first depth but is larger than the depth of the magnetic gap.

The second object indicated above may be achieved according to another aspect of this invention, which provides a process of fabricating a head core slider for a magnetic disk, including a slider body portion having an air bearing extending in a direction of length thereof, and a core portion provided adjacent one of lengthwise opposite ends of the air bearing, the core portion having a magnetic gap which is open in a track surface whose height is substantially the same as the air bearing, the magnetic gap having a depth in a direction of the height of the track surface, the process comprising the steps of: forming preliminary width-defining grooves defining a preliminary track which extends across the magnetic gap in the direction of length of the air bearing and which has a first length and a first width, each of the grooves having a first depth larger than the depth of the magnetic gap; and forming a pair of opposed final width-defining recesses formed adjacent to the magnetic gap. The final width-defining recesses define an effective track which extends across the magnetic gap in the direction of length. The effective track has a second length and a second width which are smaller than the first length and width, respectively. The second width determines a nominal width of the magnetic gap, each of the recesses having a second depth which is smaller than the first depth and larger than the depth of the magnetic gap.

In the magnetic head core slider constructed and fabricated according to the present invention, the nominal or effective width of the magnetic gap is determined by the width of the effective track, whose width, height and length are smaller than those of the preliminary track. Accordingly, the magnetic resistance at the effective track can be reduced, ensuring an increase in the signal output level upon information reading from a magnetic disk, and other improved operating characteristics of the head core. Further, the provision of the preliminary track having larger width and height than the effective track facilitates the fabrication of the head core slider, without chipping of the track portion, namely, without chipping of the effective track whose width determines the desired or nominal width of the magnetic gap.

The head core slider may be of a composite type wherein the core portion consists of a core chip secured to the slider body portion by a bonding adhesive, or a monolithic type wherein the core portion is formed integrally with the slider body portion.

The preliminary track may have a trailing portion located on one side of the magnetic gap remote from the other of the lengthwise opposite ends of the air bearing. This trailing portion is associated with the pair of opposed final width-defining recesses, and at least a part of the trailing portion has a height smaller than that of the effective track, so that dust accumulated in the final width-defining recesses may be easily removed through the trailing portion of the preliminary track.

The second object indicated above may also be achieved according to a further aspect of this invention, which provides a process of fabricating a head core slider for a magnetic disk, including a slider body portion having an air bearing extending in a direction of length thereof, and a core portion provided adjacent one of lengthwise opposite ends of the air bearing, the core portion having a magnetic gap which is open in a track surface whose height is substantially the same as the air bearing, the magnetic gap having a depth in a direction of the height of the track surface, the process comprising the steps of: preparing a core chip having preliminary width-defining grooves defining a preliminary track which extends across the magnetic gap in the direction of length of the air bearing and which has a first length and a first width, each of the grooves having a first depth larger than the depth of the magnetic gap, each the groove being filled with a glass filler; preparing a slider body having the air bearing, and a chip receiving groove formed through one of lengthwise opposite end portions of the air bearing which has the one of lengthwise opposite ends; positioning and fixing the core chip in the chip receiving groove of the slider body; and forming by etching a pair of opposed final width-defining recesses adjacent to the magnetic gap such that the recesses define an effective track which extends across the magnetic gap in the direction of length, the effective track having a second length and a second width which are smaller than the first length and width, respectively, the second width determining a nominal width of the magnetic gap, each of the recesses having a second depth which is smaller than the first depth and larger than the depth of the magnetic gap.

The second object may also be achieved according to a still further aspect of the present invention, which provides a process of fabricating a head core slider for a magnetic disk, including a slider body portion having an air bearing extending in a direction of length thereof, and a core portion provided adjacent one of lengthwise opposite ends of the air bearing, the core portion having a magnetic gap which is open in a track surface whose height is substantially the same as the air bearing, the magnetic gap having a depth in a direction of the height of the track surface, the process comprising the steps of: preparing a gap bar consisting of a first and a second blocks which are butted and integrally bonded together, the gap bar having a coil-winding groove which defines a substantially closed magnetic path, and the magnetic gap intersecting the closed magnetic path; forming a plurality of preliminary width-defining grooves in a surface of the gap bar in which the magnetic gap is open, such that the preliminary width-defining grooves define a plurality of parallel preliminary tracks each of which has a first length and a first width, each of the grooves having a first depth larger than the depth of the magnetic gap, each the groove being filled with a glass filler; forming a plurality of parallel air bearings aligned with the preliminary tracks, respectively; forming by etching a pair of opposed final width-defining recesses for each of the plurality of preliminary tracks, such that the pair of recesses define an effective track which extends across the magnetic gap, the effective track having a second length and a second width which are smaller than the first length and width, respectively, the second width determining a nominal width of the magnetic gap, each of the recesses having a second depth which is smaller than the first depth and larger than the depth of the magnetic gap; cutting the gap bar to form a yoke portion for each the effective track, the yoke portion including the magnetic gap and the effective track; and cutting the gap bar into a plurality of pieces each of which includes two of the parallel air bearings and the two yoke portions aligned with the two air bearings, respectively.

The process may further comprise a step of etching a portion of each preliminary track to provide a trailing end portion located on one side of the magnetic gap remote from the other of said lengthwise opposite ends of the corresponding air bearing, such that the trailing portion is associated with the opposed final width-defining recesses, and at least a part of the trailing portion has a height smaller than that of the corresponding effective track, so that dust accumulated in the recesses may be easily removed through the trailing portion of the preliminary track.

BRIEF DESCRIPTION OF THE DRAWINGS

The above and optional objects, features and advantages of the present invention will be better understood by reading the following detailed description of presently preferred embodiments of the invention, when considered in connection with the accompanying drawings, in which.

DETAILED DESCRIPTION OF THE PREFERRED EMBODIMENTS

Figure 1A:
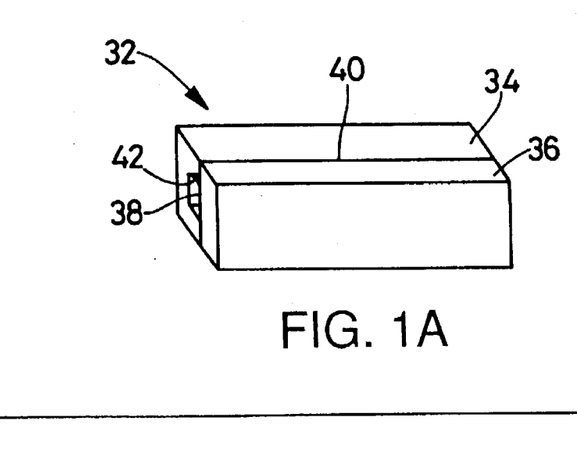
FIGS. 1A–1E are views showing process steps for fabricating a core chip for a head core slider for a magnetic disk according to the present invention.

Referring first to FIGS. 1A–1E and FIGS. 2A–2C, there is shown a process of fabricating a composite type magnetic head core slider, according to one embodiment of the present invention. Of these figures, FIGS. 1A–1E illustrates process steps for preparing core chips 50 (FIG. 1E) used for the composite type magnetic head core slider. Initially, a so-called gap bar 32 as shown in FIG. 1A is produced in a known manner, by butting and bonding together two core bars 34, 36 such as known ferrite blocks as indicated at 2, 4 in FIG. 11A. The core bar 34 has a coil-winding groove 38 formed in one of opposite surfaces thereof before it is bonded to the other core bar 36. The gap bar 32 gives a magnetic head core for each core chip 50, which has an annular or closed magnetic path, and has a pair of opposed surfaces which cooperate to define a magnetic gap 40 extending in a direction intersecting the annular magnetic path, as provided in a known head core slider. The magnetic gap 40 has a suitable amount, i.e., a predetermined spacing between the opposed surfaces indicated above. Further, a reinforcing glass filler 42 is applied to a portion of the gap bar 32 which defines a portion of the coil-winding groove 38 that is adjacent to the magnetic gap 40. This glass filler 42 reinforces the above-indicated portion of the gap bar 32, and also fills the spacing in the magnetic gap 40 to thereby protect the gap 40. The core bars 34, 36 constituting the integral gap bar 32 are bonded by a bonding glass, as well known in the art. Where the bonding glass has a softening temperature in the neighborhood of 600°–650° C., a glass material having a softening point of about 450°–500° C. is generally used for the reinforcing glass filler 42.

Figure 1B:
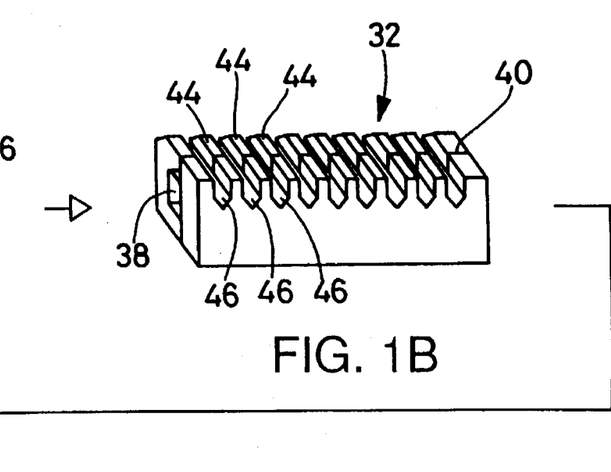
Figure 1C:
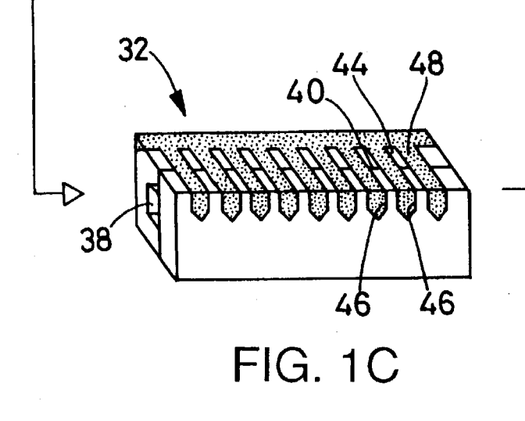

In the next step, the gap bar 32 is subjected to a chamfering operation on one corner thereof, and a grooving operation on a top surface in which the magnetic gap 40 is open. This top surface corresponds to the sliding surface of the core chip 50. The grooving operation is to form parallel grooves 46, which as shown in FIG. 1B define preliminary tracks 44 having a preliminary width (e.g., about 20–50 μm) which is larger than a nominal width of an effective track 60 (which will be described). It is noted that the preliminary width of the preliminary width-defining grooves 46 determines a preliminary width of the magnetic gap 40 on the core chip 50. The grooving operation to form the preliminary width-defining grooves 46 is effected by using a grinding wheel, for example, such that the grooves 46 extend across the magnetic gap 40 and have a depth which is sufficiently larger than the depth of the gap 40 (distance between the grooved surface and the upper end of the groove 38 as viewed in FIG. 1B). The preliminary width-defining grooves 46 are spaced apart from each other by a predetermined distance corresponding to the pitch of the preliminary tracks 44. Then, the grooves 46 are filled with a molten protective glass filler 48, as shown in FIG. 1C, in a known manner. The protective glass filler 48 has a softening point equal to or lower than that of the reinforcing glass filler 42. For instance, the grooves 46 are filled with the glass filler 48 while the melt of the filler 48 has a temperature of about 550°–600° C.

Figure 1D:
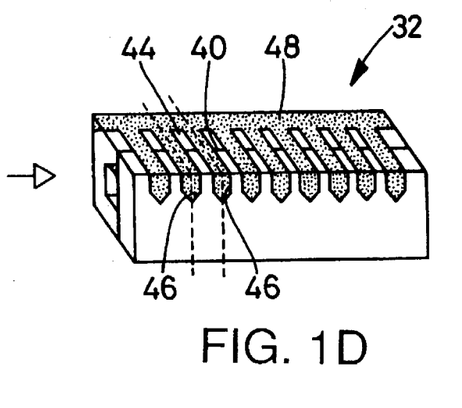
Figure 1E:
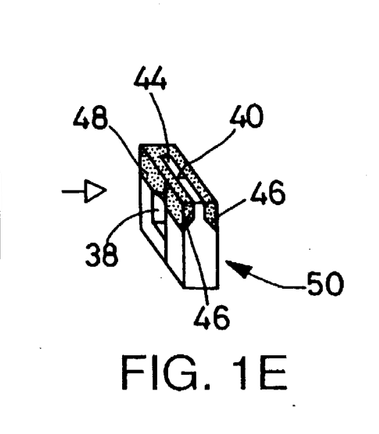

The gap bar 32 whose preliminary width-defining grooves 46 are filled with the protective glass filler 48 is then subjected to operations to grind the top surface in which the grooves 46 are formed, and the bottom surface opposite to the top surface, and if necessary the remaining two major surfaces, i.e., the opposite side surfaces. Subsequently, the gap bar 32 is cut into pieces, along cutting lines as indicated in dashed lines in FIG. 1D, which are parallel to the direction of extension of the preliminary tracks 44 and are aligned with the center of the width of each groove 46. Thus, there are prepared the individual core chips 50, one of which is shown in FIG. 1E by way of example.

Figure 2A:
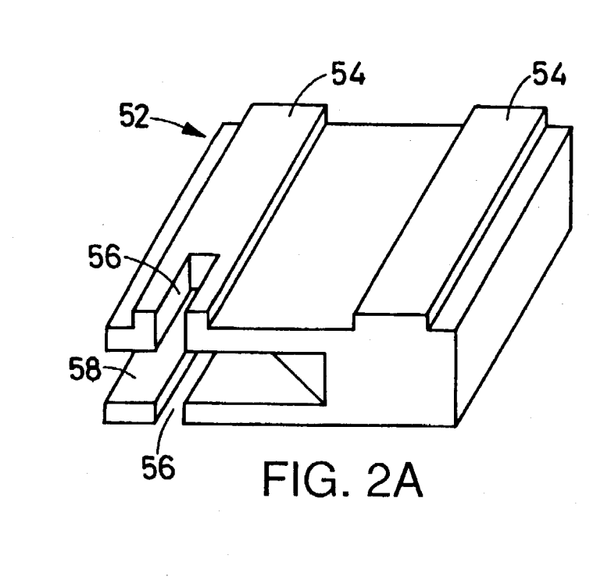
FIGS. 2A–2C are views showing a process of fabricating a head core slider using the core chip of FIGS. 1A–1E, according to one embodiment of the present invention which includes the steps of FIGS. 1A–1E.

On the other hand, a slider body 52 as shown in FIG. 2A is prepared from a non-magnetic material such as CaTiO₃. The slider body 52 has a pair of parallel air bearings 54, 54 formed on the surface corresponding to the surface of the preliminary track 44 of the core chip 50. The right and left air bearings 54 have a predetermined height and a predetermined spacing therebetween. A chip receiving groove 56 is formed so as to extend through a trailing end portion of one of the two air bearings 54, e.g., the left air bearing 54 as seen in FIG. 2A. The trailing end is one of the lengthwise opposite ends of the air bearing, which is downstream of the other lengthwise end as seen in the direction of rotation of the magnetic disk. The trailing end portion of the air bearing 54 is the end portion. The groove 56 has a width as measured in the direction of width of the air bearings 54, which width is slightly (about 10–15 μm) larger than the thickness of the core chip 50 as measured in the direction of width of the track 44 (width of the gap 40). Further, a coil-winding groove 58 is formed in one corner portion of the slider body 52, so as to traverse the chip receiving groove 56, in the direction parallel to the top surface of the slider body 52 on which the air bearings 54 are formed.

Figure 2B:
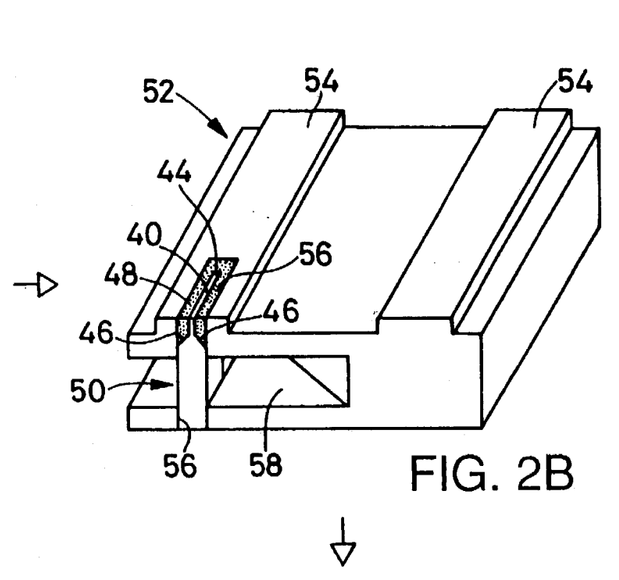

In the chip receiving groove 56 of the slider body 52 thus prepared, there is inserted the core chip 50, as shown in FIG. 2B, such that the bottom of the core chip 50 is flush with the bottom surface of the slide body 52. The slide body 52 with the core chip 50 positioned in the groove 56 is then heated to a temperature in the neighborhood of 550°–600° C. to soften or melt the protective glass filler 48 in the grooves 46 of the core chip 50. As a result, the core chip 50 is fixed in the slider body 52 with the glass filler 48. If necessary to assure firm bonding of the core chip 50 to the slider body 52, a suitable adhesive such as epoxy resin is poured in between the rear portion of the core chip 50 and the inner surfaces of the groove 56. The slider body 52 is tapered and chamfered, to provide the tapered leading end portion and the chamfered trailing end portion, and is ground to reduce the height of the preliminary track 44 to the nominal depth (to obtain the nominal depth of the magnetic gap 40).

Figure 2C:
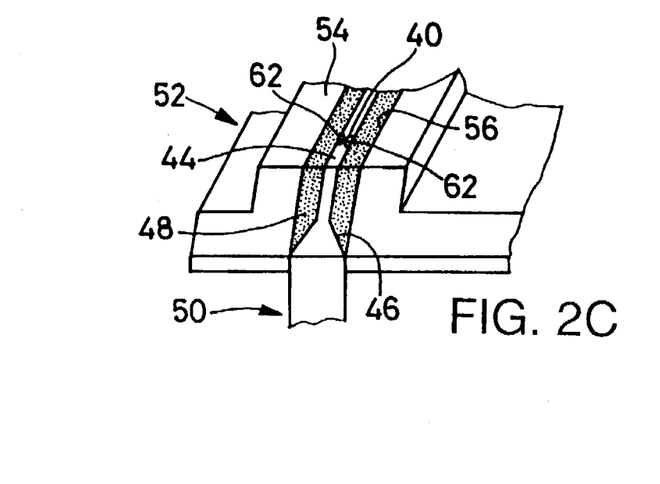
Figure 3:
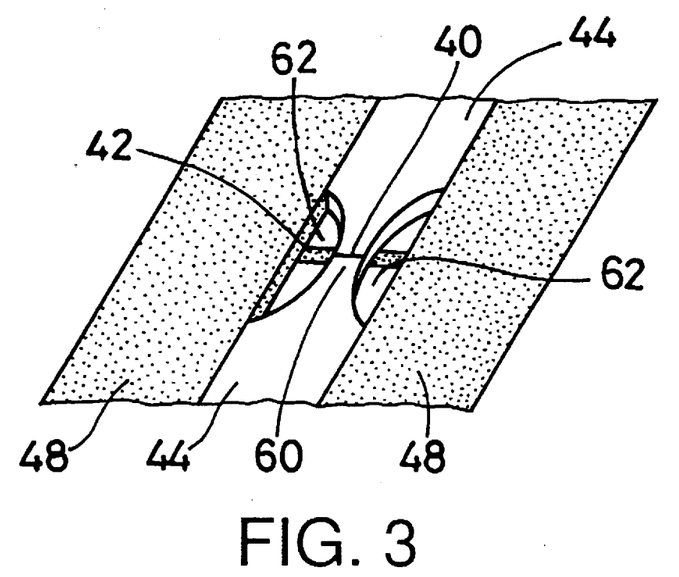
FIG. 3 is a fragmentary enlarged view of a magnetic head gap portion of the core chip during the process of FIGS. 2A–2C in which an effective track is formed on the core chip by narrowing a preliminary track.

In the next step, the assembly of the slider body 52 and the core chip 50, i.e., an intermediate product prepared in the process of fabricating the magnetic core slider is subjected to a laser-induced etching, a chemical etching or other etching operation to form the effective track 60 as shown in FIG. 3. Namely, a pair of opposed recesses 62, 62 as shown in FIGS. 2C and 3 are formed by etching in respective portions of the preliminary track 44, so as to define the final width of the magnetic gap 40, such that the preliminary width of the portion of the preliminary track 44 near the magnetic gap 40 is narrowed to provide the effective track 60 whose length and width are smaller than those of the preliminary track 44 and in which the narrowed magnetic gap 40 is open. The effective track 60 has the nominal width, which determines the final or nominal width of the magnetic gap 40. The final or effective width-defining recesses 62 has a depth which is smaller than the depth of the preliminary width-defining grooves 46 but is larger than the nominal depth of the magnetic gap 40 and which reaches the end of the coil-winding groove 38 adjacent to the gap 40. The etching operation to form the recesses 62 may be accomplished in a known manner, for example, by laser-induced etching within an etching liquid containing KOH. By this etching operation, the final width-defining recesses 62, 62 are formed so as to form the effective track 60 as shown in FIG. 3, whose width is as small as 10 μm or less.

Thus, the nominal or effective width of the magnetic gap 40 is defined by the effective track 60 formed by narrowing the width of the portion of the preliminary track 44 near the magnetic gap. Thus, the magnetic head core slider using the core chip 50 is completed. This head core slider having the narrow and short effective track 60 satisfies the recent need for high-density recording on a magnetic disk, without chipping of the track portion which is encountered in the known fabrication process for a composite type head core slider due to the relatively long, narrow and high track, during formation of the track. Accordingly, the instant process for the composite type magnetic head core slider is effective to eliminate or minimize the conventionally experienced drawbacks, such as a decrease in the yield ratio due to the chipping of the track portion, an increase in the magnetic resistance at the track portion, an adverse influence of the strain of the track portion caused by the protective glass filler, and reduction in the signal level upon information reading from the magnetic disk.

Figure 4A:
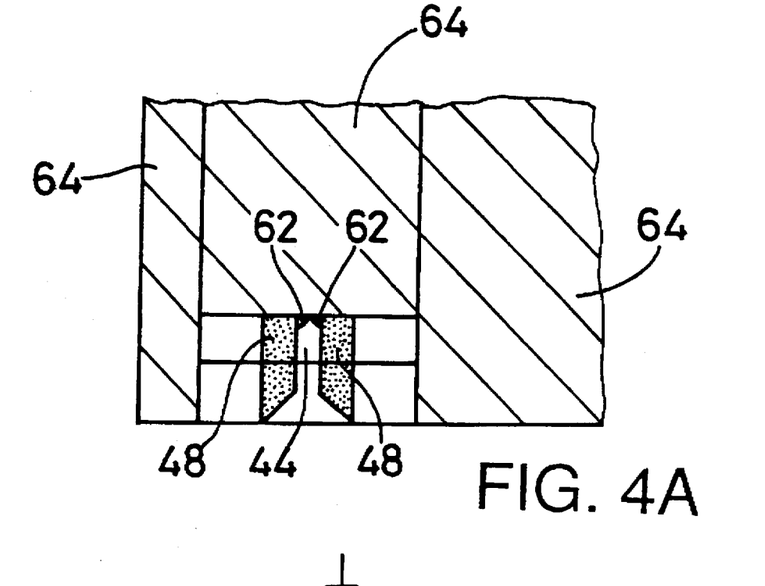
FIGS. 4A and 4B are fragmentary views illustrating an example of an etching step for recessing a trailing part of the preliminary track.
Figure 4B:
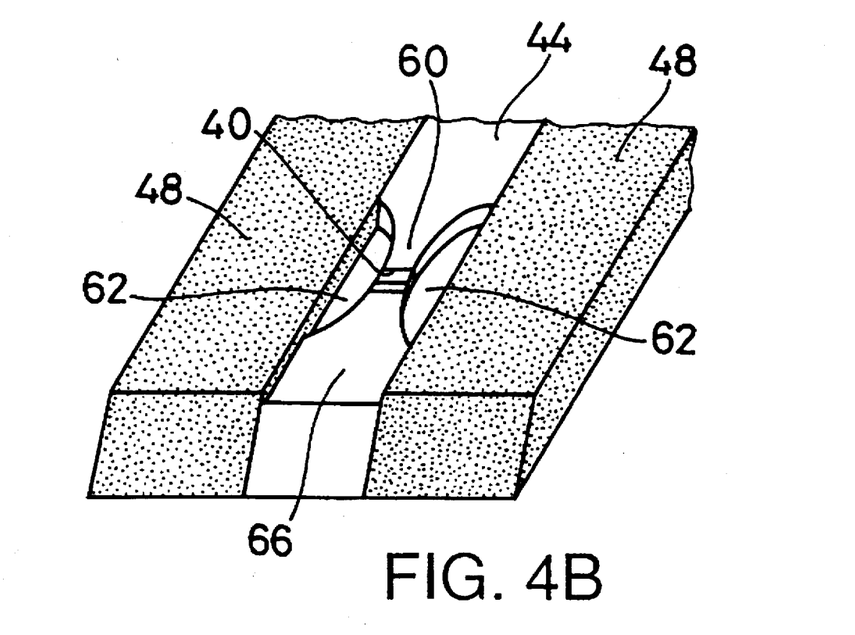

In the magnetic head core slider constructed as described above, dust or foreign matters are easily accumulated in the final width-defining recesses 62 during an operation of the head core slider in sliding contact with the magnetic disk. To avoid this accumulation of dust in the recesses 62, it is desirable that at least a trailing end portion 66 of the preliminary track 44 downstream of the magnetic gap 40 as viewed in the rotating direction of the magnetic disk have a height lower than that of the effective track 60, so that the dust may be effectively removed from the recesses 62. This lowered trailing portion 66 may be formed by etching after or before the formation of the recesses 62, preferably all the way down to the extreme downstream or trailing end of the preliminary track 44, starting from a point 10 μm or more away from the magnetic gap 40 in the downstream direction. For instance, the etching may be effected to a depth of 2 μm or more, by utilizing photolithography and a chemical etching technique using an aqueous solution of phosphoric acid, for example. An example of this etching operation is illustrated in FIGS. 4A and 4B, wherein the relevant portion of the sliding surface of the head core slider is chemically etched through an etching mask 64, to form the trailing portion 66 of the preliminary track 44 whose height is smaller than that of the effective track 60 which defines the nominal width of the magnetic gap 40. Since the surface of the trailing portion 66 is lower than the surface of the effective track 60, the dust accumulated in the recesses 62 may be easily removed outside the head core slider, during operation of the head core slider, with the magnetic disk rotating in sliding contact with the track 60.

Figure 5:
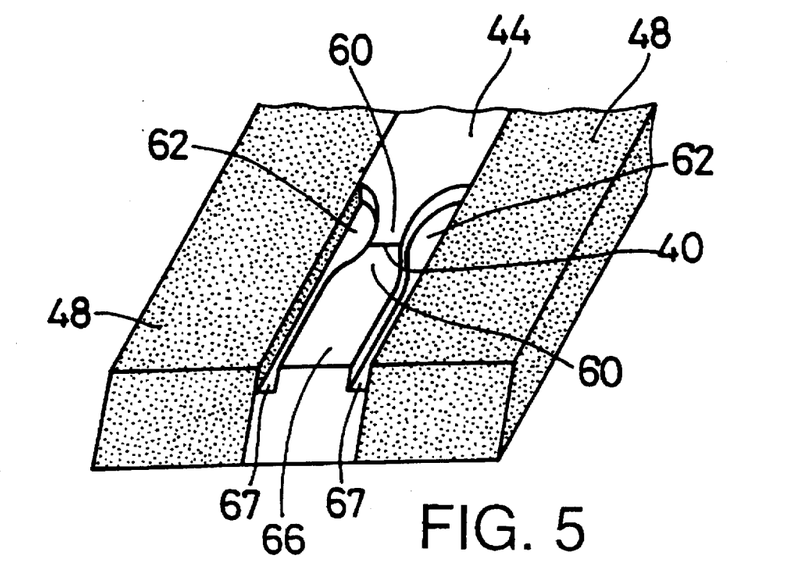
FIG. 5 is a fragmentary enlarged perspective view showing dust removal channels formed by etching along opposite edges of the trailing part of the preliminary track of the core chip, rather than etching the entire surface area of the trailing part as in the embodiments of FIG. 4B.

The trailing portion 66 whose entire surface is lower than the sliding surface of the effective track 60 may be replaced by two dust removal channels 67, 67 formed along the opposite side edges of the trailing portion 66 of the preliminary track 44, as shown in FIG. 5. Each channel 67 communicates at one end thereof with the corresponding recess 62, and is open at the other end in the trailing end face of the head core slider.

Figure 6:
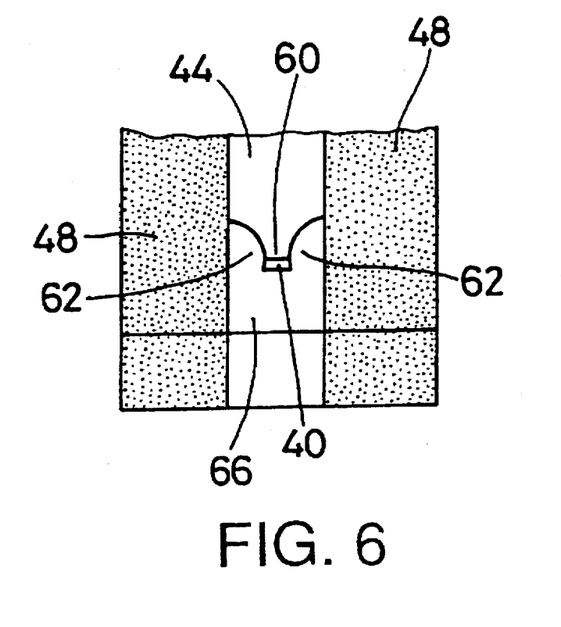
FIG. 6 is a fragmentary enlarged plan view showing the effective track, and a trailing part of the preliminary track which is recessed by laser-induced etching technique concurrently with the formation of the effective track, according to another embodiment of the invention.

Further, the trailing portion 66 whose entire surface is lower than the sliding surface of the effective track 60 may be formed by laser-induced etching, concurrently with the formation of the recesses 62 by laser-induced etching. In this case, the surface of the lowered trailing portion 66 is flush with the bottom of the recesses 62, as indicated in FIG. 6. Namely, the bottom of the recesses 62 is defined by the surface of the trailing portion 66, which is lower than the sliding surface of the effective track 60.

While the final width-defining recesses 62 are held vacant as voids and the lowered trailing portion 66 or dust removal channels 67 are provided in the illustrated embodiments of FIGS. 4–6, the recesses 62 may be filled with a glass or other filler material, like the preliminary width-defining grooves 46. In this case, the means 66, 67 for removing dust from the recesses 62 is not necessary, and the grinding operation to establish the predetermined nominal depth of the magnetic gap 40 (nominal height of the effective track 60) is performed after the recesses 62 are filled with the filler material.

In the embodiments of FIGS. 1–6, the core chip 50 is fixed in a glass or other bonding material in each slider body 52 which has the two air bearings 54. However, the respective core chips 50 may be fixed in the respective chip receiving grooves formed in a slider body blank which has a multiplicity of spaced-apart parallel air bearings formed on a surface corresponding to the sliding surface of each head core slider produced. Such a slider body blank is disclosed in commonly owned U.S. Pat. No. 5,177,654 (corresponding to Japanese Patent Application No. 2-74371). After the core chips 50 are fixed in the slider body blank, this blank is cut into head core sliders each having the core chip 50. In this case, too, the core chips 50 are subjected to etching operation to form the final width-defining recesses 62, either after or before the slider body blank is cut into the respective head core sliders.

Further, the core chips 50 may be a so-called metal-in-gap type in which a magnetic layer of a metallic material is formed on at least one of the opposed surfaces which define the magnetic gap 40, as well known in the art.

While the present invention as applied to the composite type magnetic head core slider has been described above, the principle of the present invention is equally applicable to the monolithic type magnetic head core slider, as described below by reference to FIGS. 7–10.

Figures 7A, 7B, 7C, 7D:
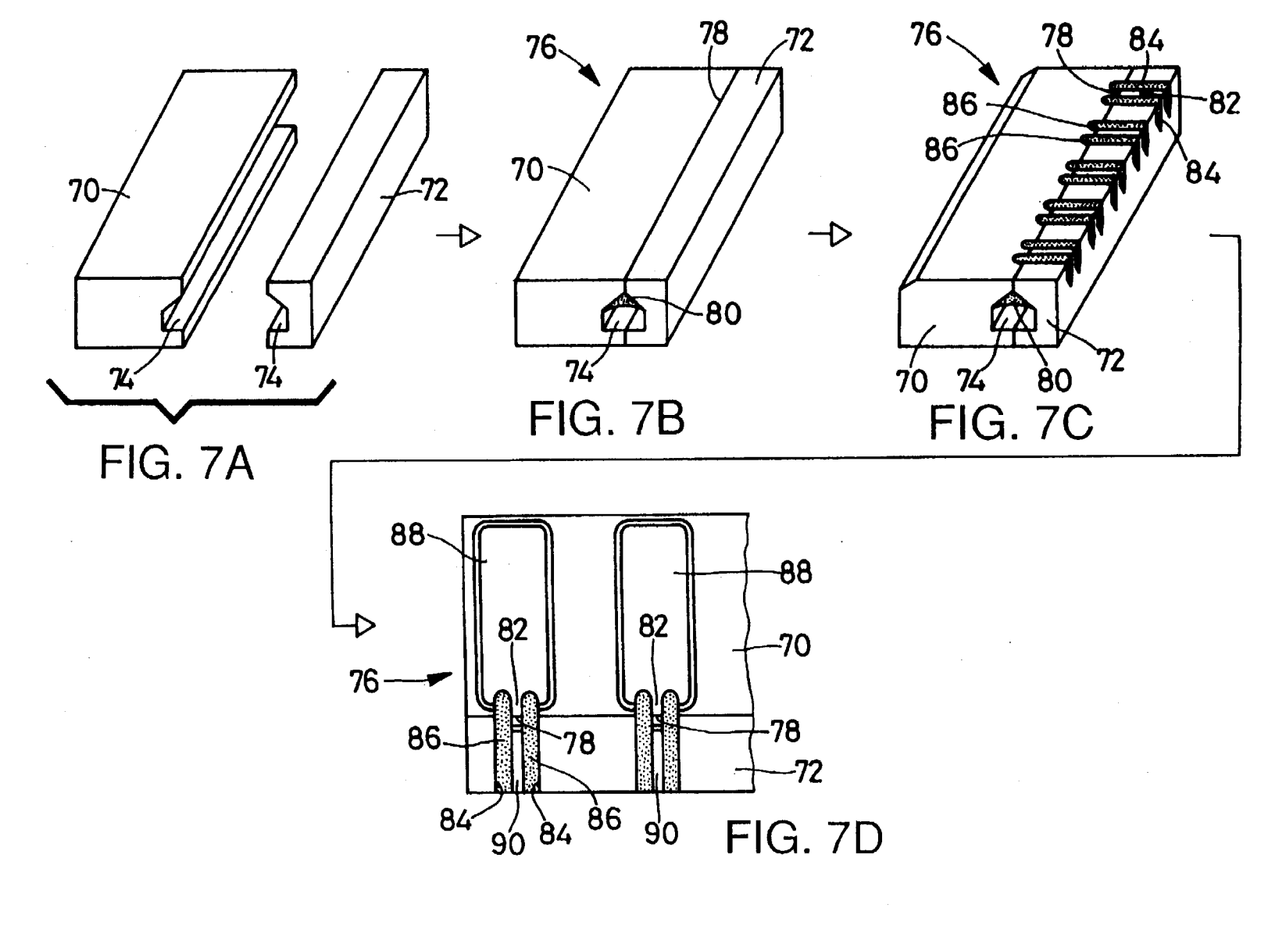
FIGS. 7A–7D are views showing a process of fabricating a monolithic type head core slider for a magnetic disk, according to a further embodiment of this invention.

In fabricating the monolithic type magnetic head core slider according to a further embodiment of the present invention, a first ferrite block 70 which gives a slider body portion of the core slider and a second ferrite block 72 which cooperates with the first ferrite block 70 to give a yoke portion of the core slider are butted and bonded together in a known manner such that coil-winding grooves 74 formed in the two ferrite blocks 70, 72 as shown in FIG. 7A cooperate to define a substantially closed magnetic path. Thus, there is prepared an integral gap bar 76 having a magnetic gap 78, as shown in FIG. 7B. The bonding of the two ferrite blocks 70, 72 is generally effected by a bonding glass material whose softening point is in the range of about 500°–600° C. The magnetic gap 78 is formed so as to extend across the closed magnetic path defined by the opposed grooved portions of the butted ferrite blocks 70, 72. A reinforcing glass filler 80 is applied to reinforce or protect the upper end portion of the grooves 74 and the magnetic gap 78, as in the known head core slider. A glass material having a softening point in the range of 400°–500° C. is usually used as the reinforcing glass filler 80.

In the next step, the surface of the gap bar 76 on which air bearings 88 (which will be described) are formed is subjected to an operation to form preliminary tracks 82 each having a preliminary width which is larger (by about 20–50 μm) than the nominal width of effective tracks 92 (which will be described). This operation to form the preliminary tracks 82 is effected by forming preliminary width-defining grooves 84 such that the bottom of each groove 84 is inclined downwardly in the direction from the first ferrite block 70 toward the second ferrite block 72 and such that the grooves 84 are spaced apart from each other in the direction of length of the gap bar 76, as shown in FIG. 7C, and as disclosed in laid-open Publication No. 60-150212 of unexamined Japanese Patent Application. Each pair of adjacent inclined-bottom grooves 84 defines a preliminary track 82. Each preliminary width-defining groove 84 extends across the magnetic gap 78, and the depth of the grooves 84 is larger than the depth of the magnetic gap 78, or reaches down into the grooves 74. The inclined-bottom grooves 84 are filled with a protective glass filler 86 whose softening point is equal to or lower than that of the reinforcing glass filler 80 indicated above.

The top surface of the gap bar 76 having the inclined-bottom preliminary width-defining grooves 84 filled with the protective glass filler 86 is ground to remove an excess of the glass filler 86, establish the nominal depth of the magnetic gap 78, and form the chamfered leading ramp.

Figure 9A:
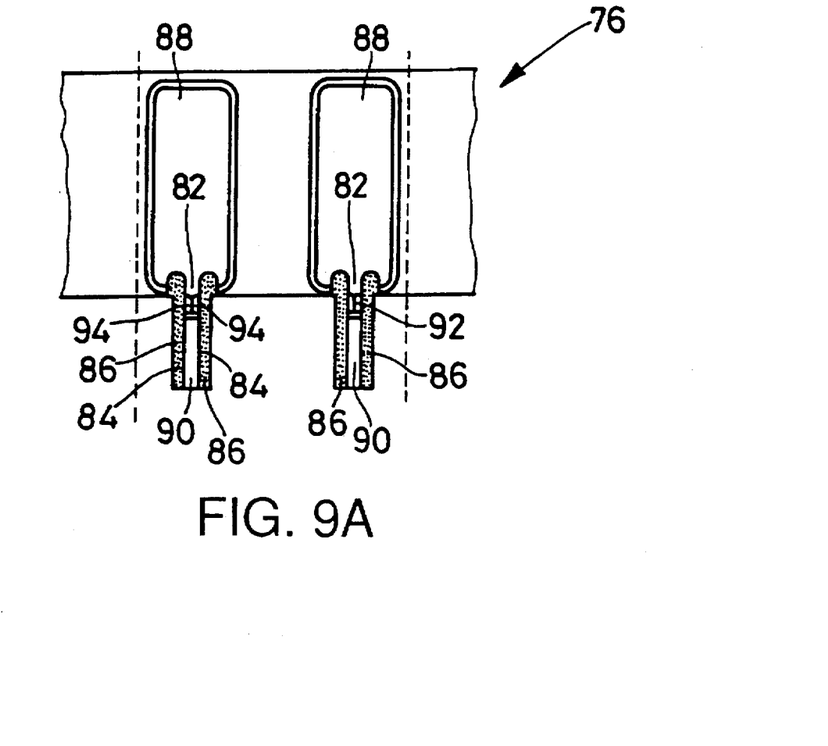
FIGS. 9A and 9B are views showing a step of cutting the gap bar to produce a head core slider having two yoke portions.
Figure 9B:
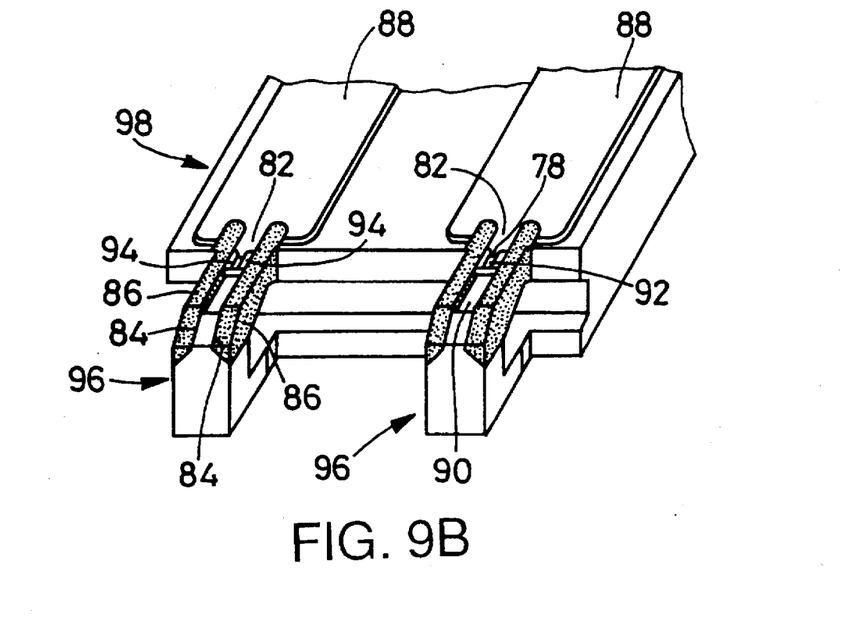

A portion of the top surface of the gap bar 76 which is provided by the first ferrite block 70 which gives the slider body portion is then subjected to a known etching operation to form a multiplicity of parallel air bearings 88 having a predetermined height, as shown in FIG. 7D, such that pairs of the air bearings 88 are spaced from each other in the direction of length of the gap bar 76, so that the slider body portion of each magnetic head core slider produced has a pair of air bearings 88, 88, as indicated in FIG. 9B. In the example of FIGS. 7C and 7D, the etching operation includes steps of forming an etching mask of a photoresist so as to cover non-etched regions of the top surface of the ferrite block 70, and chemically etching the surface in question by using an aqueous solution of $H_3PO_4$. The air bearings 88 formed by the chemical etching have inclined surfaces at their peripheral edges, due to etching in the direction parallel to the plane of the etching mask, as known in the art.

Concurrently with the formation of the air bearings 88, the surface of the gap bar 76 which is provided by the second ferrite block 72 is also subjected to an etching operation to form trailing portions 90, by using a suitable etching mask. As shown in FIG. 7D, each trailing portion 90 is aligned with the corresponding air bearing 88 and is located downstream of the magnetic gap 78 in the rotating direction of the magnetic disk. The trailing portions 90 have a height dimension which is smaller than the preliminary tracks 82, by an amount of about 20–40 μm. Like the trailing portion 66 as shown in FIG. 4B, the trailing portions 90 function to facilitate the removal of dust from final width-defining recesses 94 defining the nominal width of an effective track 92 (which will be described). While the example of FIGS. 7A–D is adapted such that the etching operations to form the air bearings 88 and the trailing portions 90 are conducted after the preliminary tracks 82 are formed, the etching operations may be conducted before the preliminary tracks 82 are formed.

Figure 10:
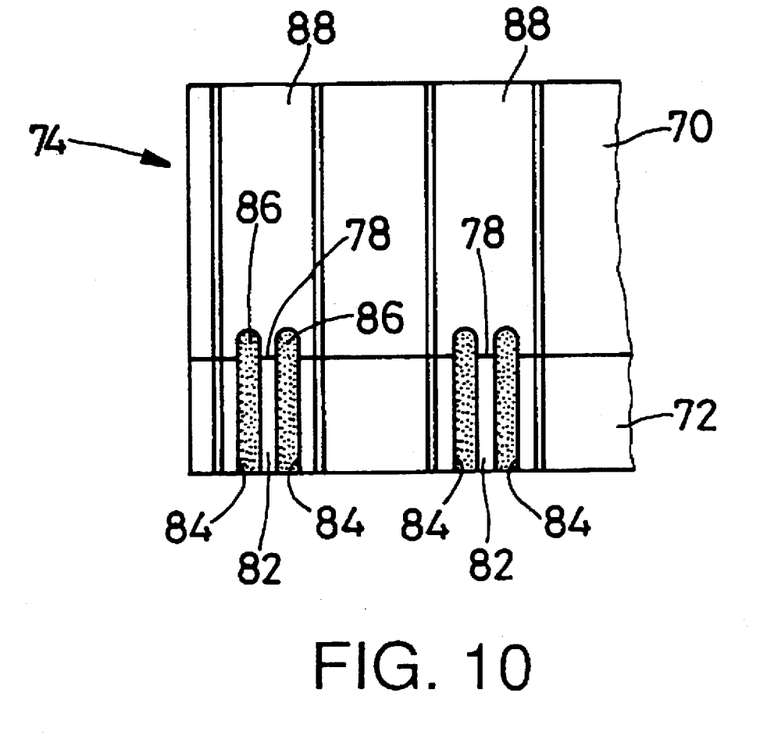
FIG. 10 is a fragmentary enlarged plan view showing air bearings formed by a mechanical cutting method.

The air bearings 88 may be formed by a method other than the chemical etching as described above. For instance, the air bearings 88 may be formed by a mechanical cutting operation using a grinding wheel, for example. In this case, it is difficult to form the trailing portions 90 whose height is lower than that of the preliminary tracks 82 (air bearings 88). Accordingly, an etching operation as performed to form the trailing portion 66 in the embodiment of FIG. 4D is effected to form the trailing portions 90 after the air bearings 88 are formed by the mechanical cutting operation.

The gap bar 76 is further subjected to an etching operation to form final width-defining recesses 94 which define an effective track 92, as in the preceding embodiment of FIG. 3 in which the final width-defining recesses 62 are formed by etching to form the effective track 60. The recesses 94 shown in FIG. 8A by way of example are formed by a laser-induced etching operation, such that the effective track 92 defined by the recesses 94 extends across the magnetic gap 78, and has a length and a width smaller than those of the preliminary track 82. The width of the effective track 92 determines the effective width of the magnetic gap 78 of each magnetic head core slider produced. The depth of the final width-defining recesses 94 is smaller than the depth of the preliminary width-defining grooves 84, but is larger than the depth of the magnetic gap 78.

Figure 8A:
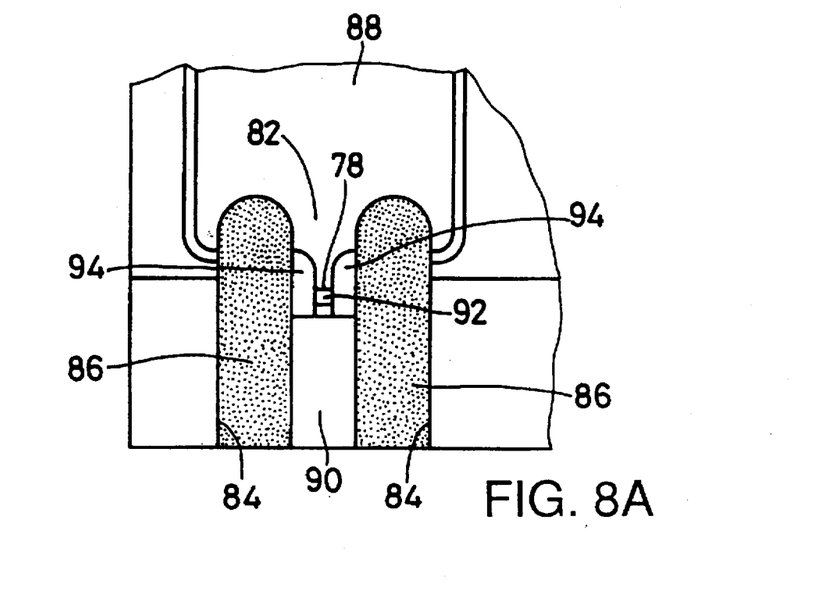
FIGS. 8A and 8B are fragmentary enlarged plan views illustrating a step of forming a yoke portion by cutting a gap bar prepared in the process of FIGS. 6A–6D, which gap bar has air bearings and preliminary and effective tracks.
Figure 8B:
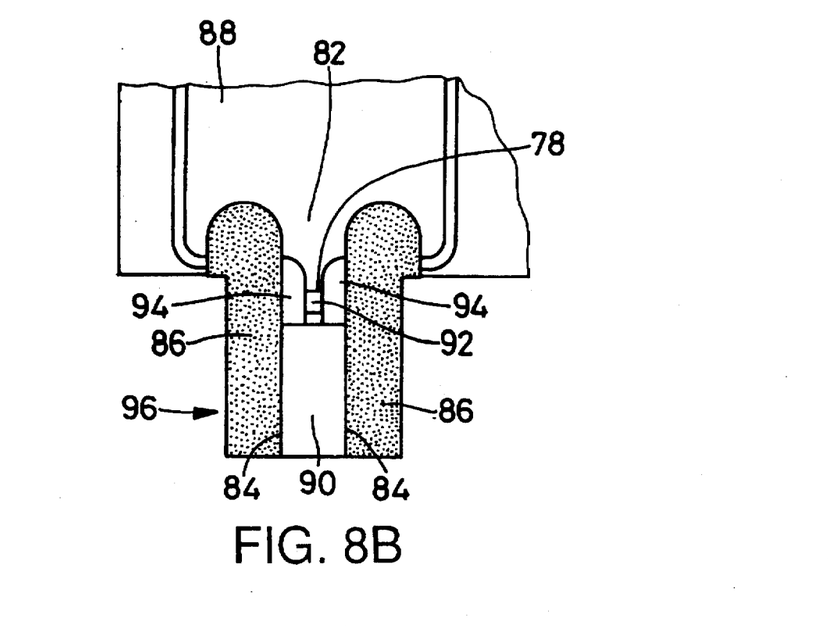

The gap bar 76 having the preliminary tracks 82, air bearings 88, trailing portions 90 and effective tracks 92 is then chamfered to provide a chamfered trailing end portion, and is cut to provide yoke portions 96 as shown in FIG. 8B. Each yoke portion 96 is provided by the second ferrite block 72 and an adjacent end portion of the first ferrite block 70. The gap bar 76 is then cut into individual magnetic head core sliders, along parallel cutting lines indicated in dashed lines in FIG. 9A. As shown in FIG. 9B, each core slider has the slider body portion 98 having the parallel right and left air bearings 88, and the two yoke portions 96 having the respective preliminary and final tracks 82, 92 aligned with the corresponding air bearings 88. Each effective track 92 of each core slider determines the effective or nominal width of the magnetic gap 78.

In the monolithic type magnetic head core slider constructed as described above, too, the effective track 92 which determines the nominal width of the magnetic gap 78 is formed with a relatively short length, and with a minimum required height, whereby the magnetic resistance at the effective track 92 can be made sufficiently low, and the adverse effect of the filler glass on the opposite sides of the effective track 92 can be minimized or avoided. Thus, the magnetic head core slider is effectively protected from otherwise possible chipping of the track portion, and is easily fabricated, while being substantially free from the conventionally experienced operational drawbacks such deterioration of the signal output level upon information reading from a magnetic disk.

While the magnetic head core slider and the process of fabricating the same according to the present invention have been described in the presently preferred embodiments, it is to be understood that the invention is not limited to the details of the illustrated embodiments, but may be embodied with various changes, modifications and improvements, which may occur to those skilled in the art without departing from the spirit and scope of the invention defined in the accompanying claims.

For instance, the monolithic type type magnetic head core slider may also be of a metal-in-gap type having a magnetic layer of a metallic material formed on at least one of the opposed surfaces which define the magnetic gap 78, as in the composite type described above. The metal-in-gap type is particularly suitable for use with a magnetic disk having a relatively large coercise force.

What is claimed is:

1. A head core slider for a magnetic disk, including a slider body portion having an air bearing surface extending in a direction of length thereof, a core portion adjacent one of lengthwise opposite ends of the air bearing surface, said core portion having a magnetic gap which is open in a track surface which is at substantially the same height as said air bearing surface, said magnetic gap having a depth in a direction perpendicular to said air bearing surface, comprising:

glass bodies having upper surfaces at the same height as said track surface and defining opposite edges of a track zone which extends across said magnetic gap in the direction of length of said air bearing surface and which has a first length and a first width, said first width being smaller than the width of said core portion, each of said glass bodies having a first depth larger than said depth of said magnetic gap; and means for defining a pair of opposed track width-defining recesses formed in said zone adjacent to said magnetic gap and defining an effective track which extends across said magnetic gap in said direction of length, said effective track having a second length and a second width which are smaller than said first length and width, respectively, said second width determining a nominal width of said magnetic gap, each of said recesses being open in said track surface and exposed to atmosphere, each of said recesses having a second depth which is smaller than said first depth of said glass bodies and larger than the depth of said magnetic gap, whereby said recesses prevent strain in said effective track, which strain would otherwise result from presence of glass material adjacent said effective track.

2. A composite type head core slider according to claim 1, wherein said core portion consists of a core chip secured to said slider body portion by a bonding adhesive.

3. A monolithic type head core slider according to claim 1, wherein said core portion is formed integrally with said slider body portion.

4. A head core slider according to claim 1, wherein track zone of said core portion has a trailing end portion located downstream of said magnetic gap in the direction of movement of the disk in use, said trailing end portion being associated with said pair of opposed track width-defining recesses, at least a part of said trailing end portion being recessed relative to said effective track.

5. A head core slider according to claim 1, wherein said slider body portion has two parallel air bearing surfaces, and said core portion is provided for one of said two parallel air bearing surfaces.

6. A head core slider according to claim 1, wherein said slider body portion has two parallel air bearing surfaces, and said core portion is provided for each of said two parallel air bearing surfaces.

* * * * *